(12) United States Patent
Peng et al.

(10) Patent No.: US 8,284,551 B2
(45) Date of Patent: Oct. 9, 2012

(54) APPARATUS WITH DATA STORAGE DEVICES

(75) Inventors: Wen-Tang Peng, Taipei Hsien (TW); Mo-Ming Yu, Shenzhen (CN); Lei Zheng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 245 days.

(21) Appl. No.: 12/900,609

(22) Filed: Oct. 8, 2010

(65) Prior Publication Data
US 2011/0267760 A1  Nov. 3, 2011

(51) Int. Cl.
*G06F 1/16* (2006.01)

(52) U.S. Cl. .......... 361/679.31; 713/323; 345/619; 360/245.8; 439/638

(58) Field of Classification Search .......... 711/114, 711/171; 307/64, 66; 713/300, 302, 320, 713/323; 345/1.1, 419, 473, 597, 173, 156, 345/179, 537, 211, 30, 619; 360/98.01, 903, 360/245.8, 97.12, 69; 248/298.1, 224.8; 439/660, 76.1, 31, 638, 358, 108, 346; 361/679.33, 361/679.34, 679.31, 679.01, 679.09, 679.29, 361/679.26, 679.37, 679.32, 679.2, 679.36, 361/679.41, 679.03, 679.57, 679.02, 679.46, 361/679.61

See application file for complete search history.

(56) References Cited

U.S. PATENT DOCUMENTS

| | | | | |
|---|---|---|---|---|
| 5,602,717 | A | * | 2/1997 | Leshem et al. ........... 361/679.34 |
| 2011/0085291 | A1 | * | 4/2011 | Lin et al. ................. 361/679.33 |
| 2011/0182040 | A1 | * | 7/2011 | Ellul et al. ..................... 361/737 |
| 2011/0267764 | A1 | * | 11/2011 | Wilke ...................... 361/679.33 |

* cited by examiner

*Primary Examiner* — Hung Duong

(74) *Attorney, Agent, or Firm* — Altis Law Group, Inc.

(57) ABSTRACT

An apparatus includes an enclosure, a first interconnect card, a second interconnect card, and a connection circuit board. The enclosure receives a first data storage device and a second data storage device. The first interconnect card is connected to the first data storage device. The second interconnect card is connected to the second data storage device. The second interconnect card includes an external connector which is capable of connecting to a peripheral apparatus outside of the enclosure. The connection circuit board is connected to the first and the second interconnect cards. The first data storage device communicates with the external connector via the first interconnect card, the connection circuit board, and the second interconnect card. The second interconnect card communicates with the external connector via the second interconnect card.

18 Claims, 4 Drawing Sheets

APPARATUS WITH DATA STORAGE DEVICES

BACKGROUND

1. Technical Field

The present disclosure relates to an apparatus with data storage devices.

2. Description of Related Art

Certain computer systems, such as storage systems, are typically constructed from many data storage devices that are positioned and stacked relative to each other in an enclosure. Each of the data storage devices is electrically connected to a main board of the computer system for data storage or exchange. The computer system always includes a number of data cables and power cables for connecting the data storage devices to the main board. Because there are so many cables in the computer system, it becomes messy, which is harmful to the steady and stable operations of the computer system.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
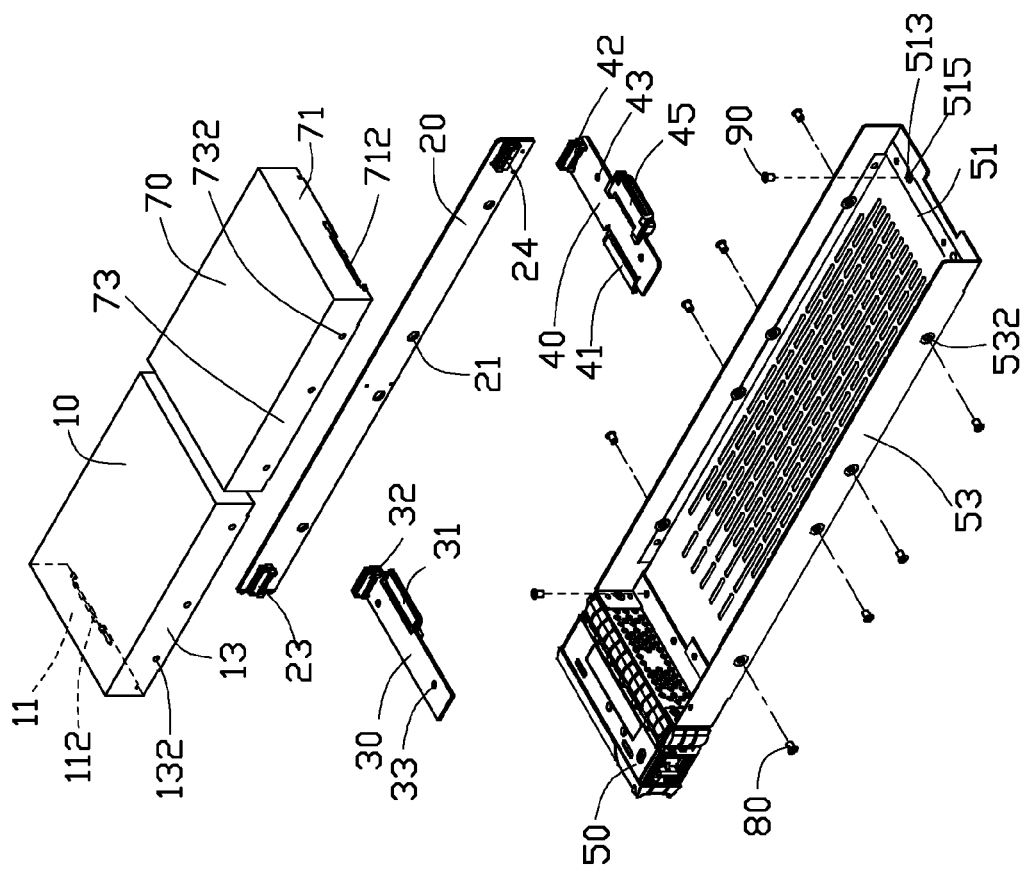
FIG. 1 is an isometric and exploded view of a data storage device assembly in accordance with an embodiment.
Figure 2:
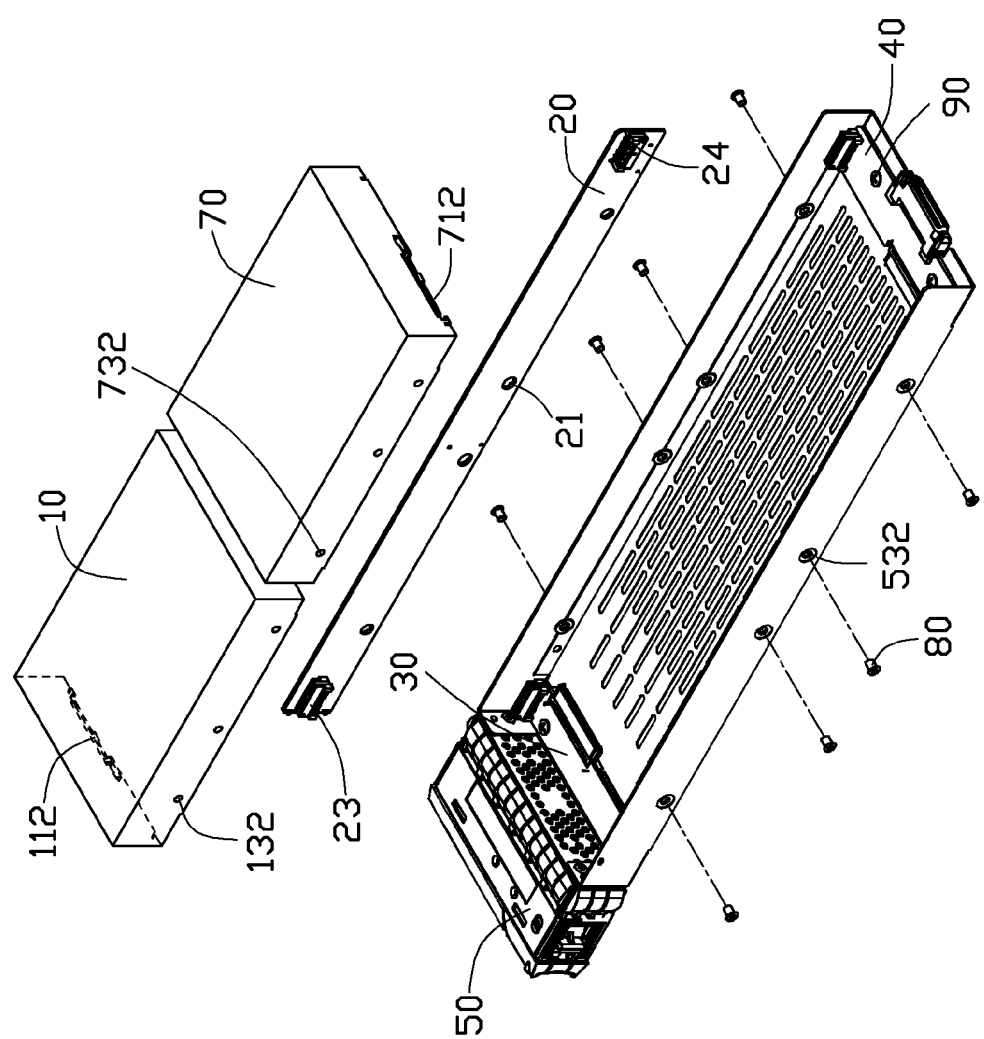
FIG. 2 is a partially assembled view of the data storage device of FIG. 1.
Figure 3:
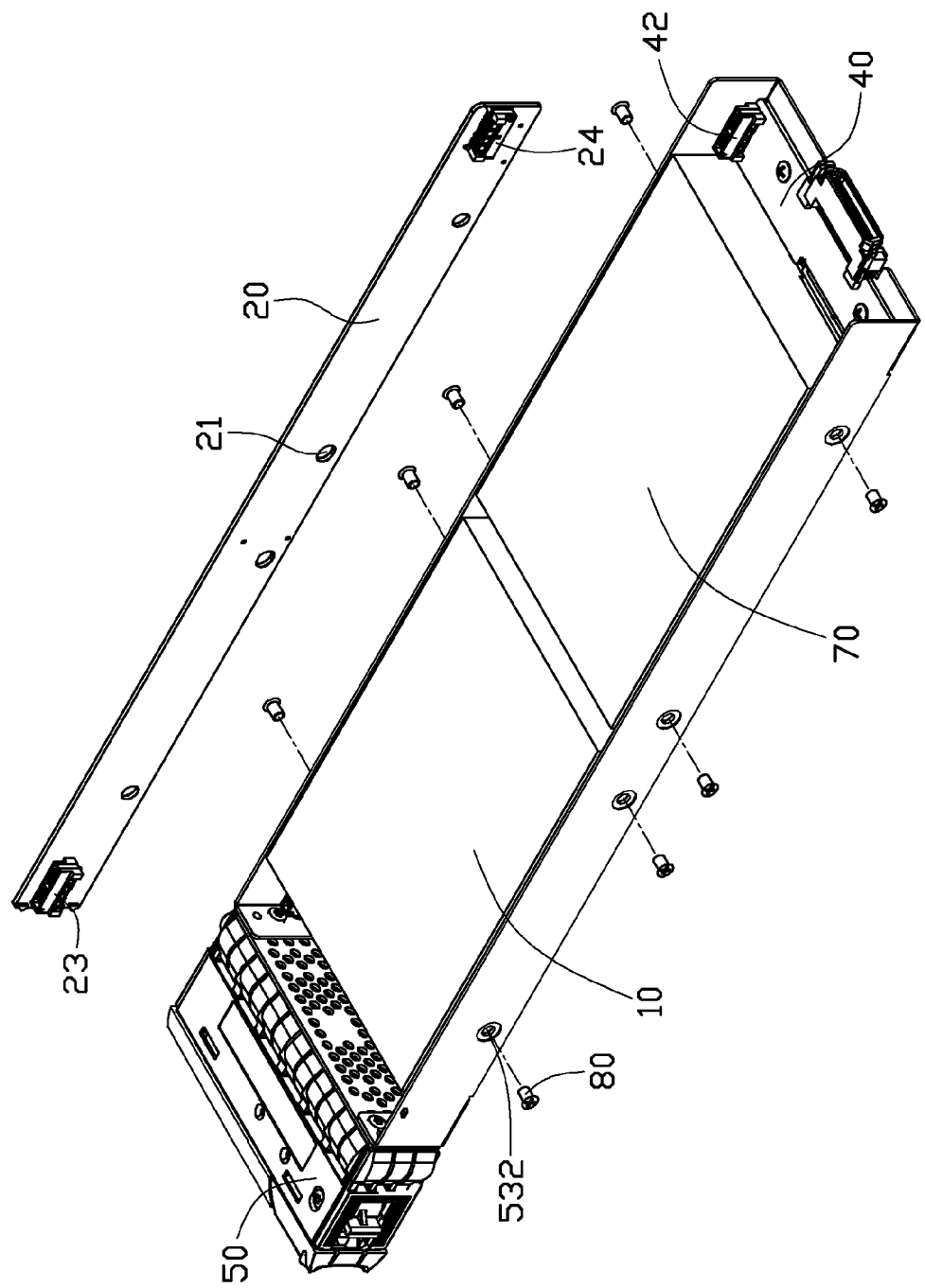
FIG. 3 is another partially assembled view of the data storage device of FIG. 1.
Figure 4:
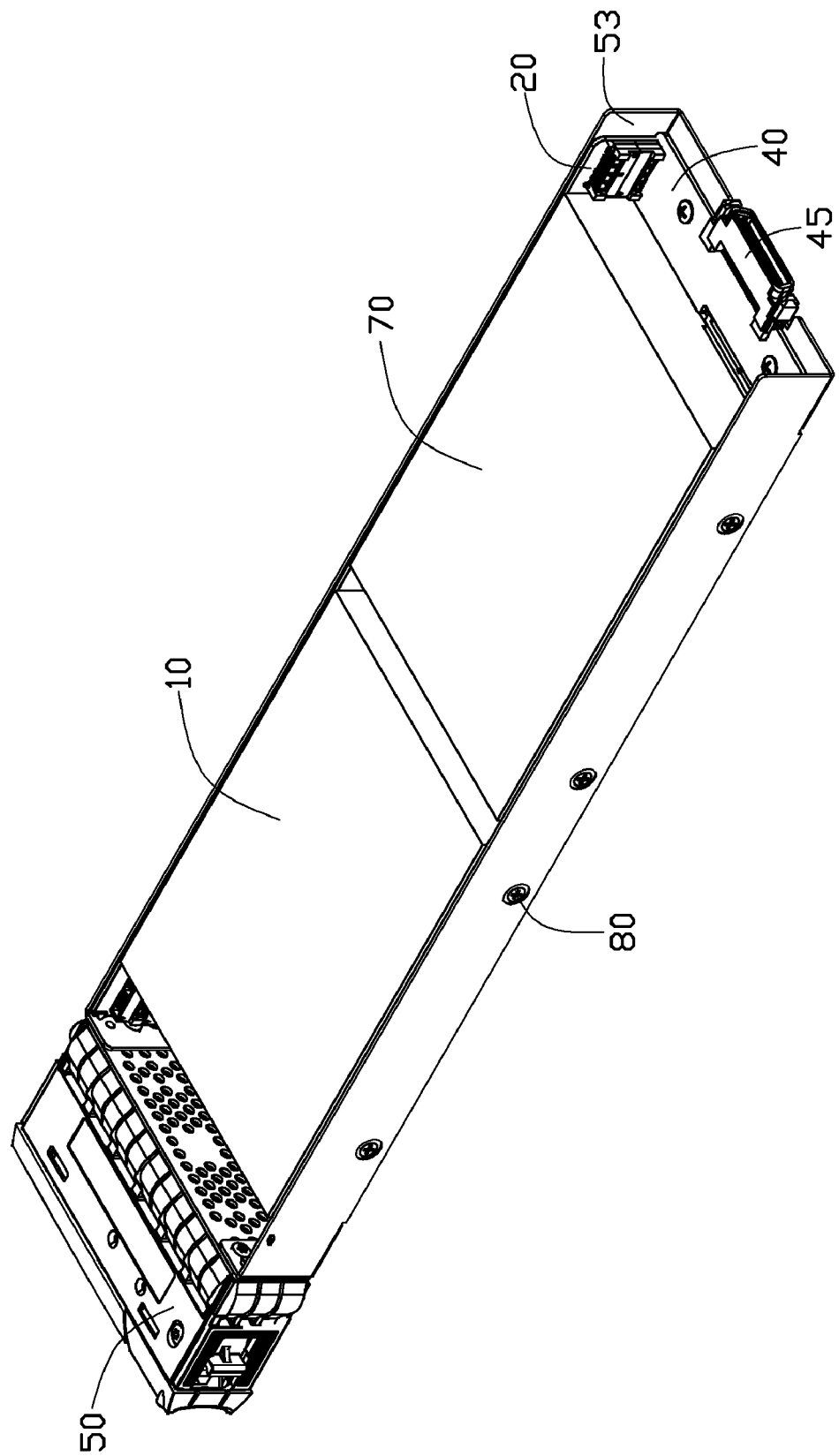
FIG. 4 is an assembled view of the data storage device of FIG. 1.

Referring to FIG. 1, a data storage assembly in accordance with an embodiment includes: a first data storage device 10, a second data storage device 70, a connection circuit board 20, a first interconnect card 30, a second interconnect card 40, and an enclosure 50, which is capable of receiving the first and second data storage devices 10 and 70 therein.

The first data storage device 10 includes a first front wall 11 and two first side walls 13 formed on opposites edges of the front wall 11. Each first side wall 13 defines a number of first mounting holes 132 therein. A first port 112 is mounted on the first front wall 11 in a first direction. The second data storage device 70 includes a second front wall 71 and two second side walls 73 formed on opposites edges of the front wall 71. The first front wall 11 and the second front wall 71 oppose each other. Each second side wall 73 defines a number of second mounting holes 732. A second port 712 is mounted on the second front wall 71 in the first direction.

The first and second interconnect cards 30 and 40 extends in the first direction. The first interconnect card 30 includes a first device connector 31, which extends in the first direction. The first device connector 31 is capable of connecting to the first port 112 in the first direction. The first interconnect card 30 further includes a first board connector 32, which extends in a second direction. The second direction is perpendicular to the first direction. The first board connector 32 is connected to the first device connector 31. A number of first through holes 33 are defined in the first interconnect card 30.

The second interconnect card 40 includes a second device connector 41 which extends in the first direction. The second device connector 41 is capable of connecting to the second port 712 in the first direction. The second interconnect card 40 further includes a second board connector 42 and an external connector 45. The second device connector 41 and the external connector 45 are mounted on opposite edges of the second interconnect card 40. The second board connector 42 extends in the second direction.

The second board connector 42, the second device connector 41, and the external connector 45 are connected to each other. A number of second through holes 43 are defined in the second interconnect card 40.

The connection circuit board 20 is situated in the second direction. The connection circuit board 20 includes a first connection port 23 and a second connection port 24. The first connection port 23 and the second connection port 24 both extends in the second direction. The first connection port 23 is adapted to connect to the first board connector 32 of the first interconnect card 30 in the second direction. The second connection port 24 is adapted to connect to the second board connector 42 of the second interconnect card 40 in the second direction. The first connection port 23 and the second board connection port 24 are connected to each other. The connection circuit board 20 defines a number of fixing holes 21.

The enclosure 50 includes a bottom plate 51 which is located in the first direction. Left and right edges of the bottom plate 51 extend perpendicularly to form a pair of side plates 53. The side plates 53 define a number of through holes 532 corresponding to the mounting holes 132, 732, and the fixing holes 21. A front and rear portions of the bottom plate 51 define a number of screw holes 515.

Referring to FIGS. 1 to 4, in assembly of the data storage device assembly, the first interconnect card 30 is first placed on the front portion of the bottom plate 51 so that the through holes 33 are in alignment with the screw holes 515. A number of screws 90 are mounted in the through holes 33 and screw holes 515 to mount the first interconnect card 30 on the bottom plate 51. Then, the second interconnect card 40 is placed on the rear portion of the bottom plate 51, with the through holes 43 in alignment with the screw holes 515. A number of screws 90 are mounted in the through holes 43 and the screw holes 515 to mount the second interconnect card 40 on the bottom plate 51.

The first data storage device 10 is located on the bottom plate 51 of the enclosure 50 to have the first mounting holes 132 of the first data storage device 10 aligned with the through holes 532 of the enclosure 50. At this position, the first port 112 is connected to the first device connector 31. Then, the second data storage device 70 is located on the bottom plate 51 to have the second mounting holes 732 aligned with the through holes 532. At this position, the second port 712 connects to the second device connector 41.

The connection circuit board 20 is moved to have the first connection port 23 connect to the first board connector 32 of the first interconnect card 30, and have the second connection port 24 connect to the second board connector 42 of the second interconnect card 40. At this position, the connection circuit board 20 is sandwiched between the first and second side walls 13, 73 and one of the two side plates 53 of the enclosure 50. The fixing holes 21 are aligned with through holes 532 of the enclosure 50. A number of screws 80 are mounted in the mounting holes 132, 732, the through holes 532, and the fixing holes 21 to mount the first and second data storage devices 10, 70, and the connection circuit board 20 on the enclosure 50.

In use, the external connector 45 is connected to a connector of a computer system. The first data storage device 10 communicates with the computer system via the first interconnect card 30, the connection circuit board 20, and the second interconnect card 40. The second data storage device 70 communicates with the computer system via the second interconnect card 40. Therefore, less cable is used in the computer system, and a simplified interior is achieved.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An apparatus, comprising:
   an enclosure with a first data storage device and a second data storage device located therein;
   a first interconnect card connected to the first data storage device;
   a second interconnect card connected to the second data storage device, the second interconnect card comprising an external connector which is capable of connecting to a peripheral apparatus outside of the enclosure; and
   a connection circuit board connected to the first interconnect card and the second interconnect card; wherein the first data storage device communicates with the external connector via the first interconnect card, the connection circuit board, and the second interconnect card; and the second interconnect card communicates with the external connector via the second interconnect card.

2. The apparatus of claim 1, wherein the first data storage device comprises a first port which extends in a first direction, the first interconnect card connects to the first port in the first direction; the second data storage device comprises a second port which extends in the first direction, and the second interconnect card connects to the second port in the first direction.

3. The apparatus of claim 2, wherein the first interconnect card comprises a first board connector which extends in a second direction, the second direction is substantially perpendicular to the first direction, the second interconnect card comprises a second board connector which extends in the second direction, and the connection circuit board connects to the first board connector and the second board connector in the second direction.

4. The apparatus of claim 3, wherein the first interconnect card comprises a first device connector connected to the first port, the second interconnect card comprises a second device connector connected to the second port, and both of the first device connector and the second device connector extends in the first direction; and the first board connector is connected to the first device connector on the first interconnect card, and the second board connector is connected to the second device connector on the second interconnect card.

5. The apparatus of claim 4, wherein the second device connector and the external connector are mounted on opposite edges of the second interconnect card.

6. The apparatus of claim 3, wherein the connection circuit board comprises a first connection port and a second connection port, and both of the first connection port and the second connection port extend in the second direction; the first connection port is connected to the first board connector in the second direction, the second connection port is connected to the second board connector in the second direction; and the first connection port and the second connection port are connected to each other on the connection circuit board.

7. The apparatus of claim 1, wherein the enclosure comprises a bottom plate and a side plate; the first data storage device, the second data storage devices, the first interconnect card, and the second interconnect card are secured on the bottom plate; and the connection circuit board is secured on the side plate.

8. The apparatus of claim 7, wherein a front portion of the bottom plate defines a plurality of first screw holes, a rear portion of the bottom plate defines a plurality of second screw holes; the first interconnect card defines a plurality of first through holes, the second interconnect card defines a plurality of second through holes; the first interconnect card is secured to the front portion of the bottom plate by a plurality of first screws mounted in the first screw holes and the first through holes of the first interconnect card, and the second interconnect card is secured to the rear portion of the bottom plate by a plurality of second screws mounted in the second screw holes and the second through holes of the second interconnect card.

9. The apparatus of claim 7, wherein the connection circuit board is sandwiched between the side plate and the first data storage device and the second data storage device.

10. An apparatus, comprising:
    an enclosure comprising a first data storage device and a second data storage device mounted therein;
    a first interconnect card connected to the first data storage device in a first direction; and
    a second interconnect card connected to the second data storage device in the first direction, the second interconnect card comprising an external connector which is capable of connecting to a peripheral apparatus; and
    a connection circuit board connected to the first interconnect card and the second interconnect card in a second direction which is perpendicular to the first direction;
    wherein the first data storage device communicates with the external connector via the first interconnect card, the connection circuit board, and the second interconnect card; and the second interconnect card communicates with the external connector via the second interconnect card.

11. The apparatus of claim 10, wherein the first data storage device comprises a first port which extends in the first direction, the first interconnect card connects to the first port in the first direction; the second data storage device comprises a second port which extends in the first direction, and the second interconnect card connects to the second port in the first direction.

12. The apparatus of claim 11, wherein the first interconnect card comprises a first board connector which extends in the second direction, the second interconnect card comprises a second board connector which extends in the second direction, and the connection circuit board connects to the first board connector and the second board connector in the second direction.

13. The apparatus of claim 12, wherein the first interconnect card comprises a first device connector connected to the first port, the second interconnect card comprises a second device connector connected to the second port, and both of the first device connector and the second device connector extend in the first direction; and the first board connector is connected to the first device connector on the first interconnect card, and the second board connector is connected to the second device connector on the second interconnect card.

14. The apparatus of claim 13, wherein the second device connector and the external connector are mounted on opposite edges of the second interconnect card.

15. The apparatus of claim 12, wherein the connection circuit board comprises a first connection port and a second connection port, and both of the first connection port and the second connection port extend in the second direction; the first connection port is connected to the first board connector in the second direction, the second connection port is connected to the second board connector in the second direction; and the first connection port and the second connection port are connected to each other on the connection circuit board.

16. The apparatus of claim 10, wherein the enclosure comprises a bottom plate and a side plate; the first data storage device, the second data storage device, the first interconnect card, and the second interconnect card are secured on the bottom plate; and the connection circuit board is secured on the side plate.

17. The apparatus of claim 16, wherein a front portion of the bottom plate defines a plurality of first screw holes, a rear portion of the bottom plate defines a plurality of second screw holes; the first interconnect card defines a plurality of first through holes, the second interconnect card defines a plurality of second through holes; the first interconnect card is secured to the front portion of the bottom plate by a plurality of first screws mounted in the first screw holes and the first through holes of the first interconnect card, and the second interconnect card is secured to the rear portion of the bottom plate by a plurality of second screws mounted in the second screw holes and the second through holes of the second interconnect card.

18. The apparatus of claim 16, wherein the connection circuit board is sandwiched between the side plate and the first data storage device and the second data storage device.

* * * * *

UNITED STATES PATENT AND TRADEMARK OFFICE
CERTIFICATE OF CORRECTION

| | | |
|---|---|---|
| PATENT NO. | : 8,284,551 B2 | Page 1 of 1 |
| APPLICATION NO. | : 12/900609 | |
| DATED | : October 9, 2012 | |
| INVENTOR(S) | : Wen-Tang Peng, Mo-Ming Yu and Lei Zheng | |

It is certified that error appears in the above-identified patent and that said Letters Patent is hereby corrected as shown below:

Title Page, below Item (65) insert:

-- (30)    Foreign Application Priority Data

Apr. 28, 2010   (CN) ...............................201010158322.0 --

Signed and Sealed this
Eighteenth Day of March, 2014

Michelle K. Lee
*Deputy Director of the United States Patent and Trademark Office*